UNITED STATES PATENT OFFICE.

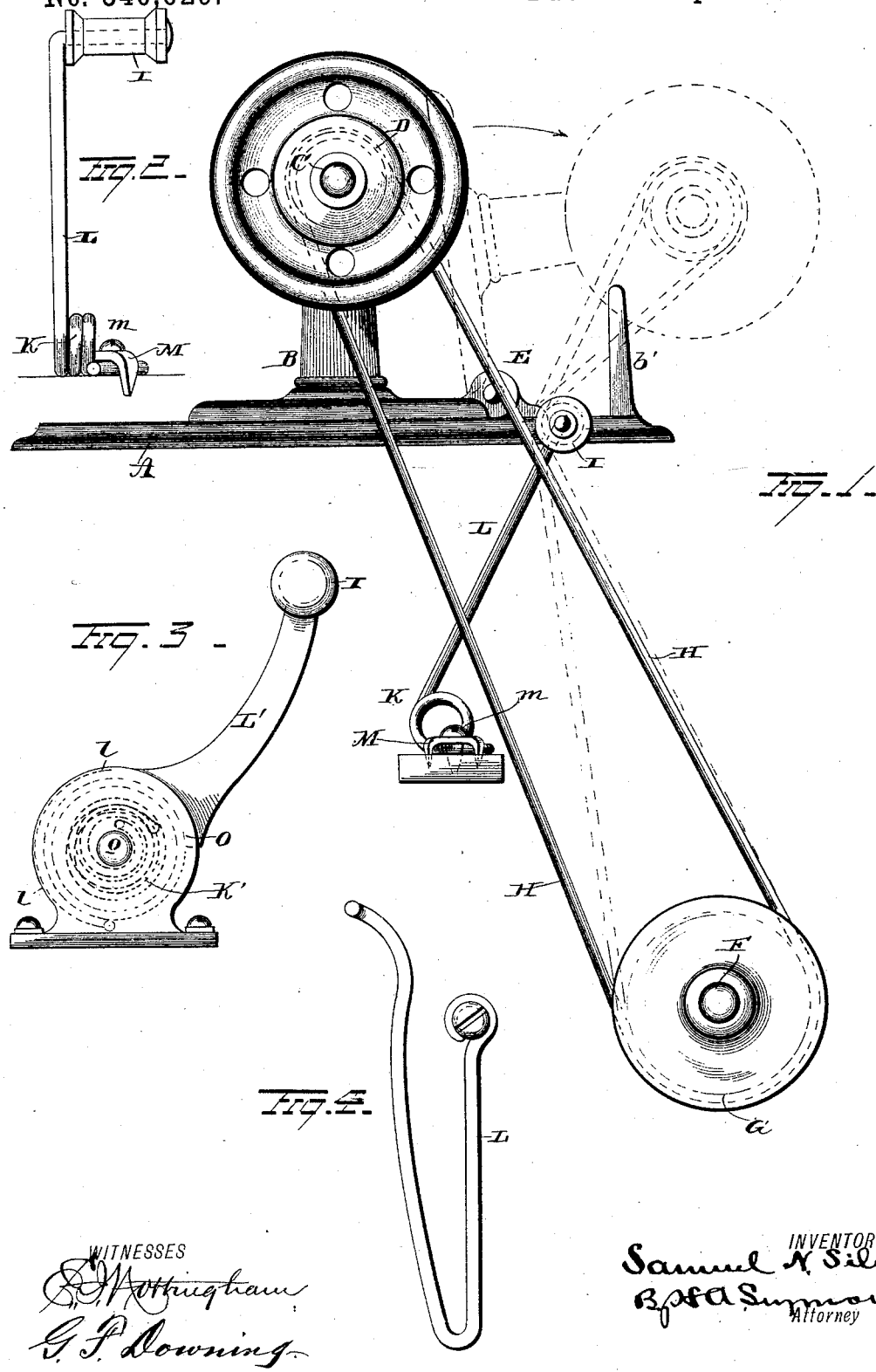

SAMUEL N. SILVER, OF AUBURN, MAINE.

BELT CATCHER AND SUPPORTER.

SPECIFICATION forming part of Letters Patent No. 340,629, dated April 27, 1886.

Application filed January 26, 1886. Serial No. 189,818. (No model.)

*To all whom it may concern:*

Be it known that I, SAMUEL N. SILVER, of Auburn, in the county of Androscoggin and State of Maine, have invented certain new and useful Improvements in Belt Catchers and Supporters; and I do hereby declare the following to be a full, clear, and exact description of the invention, such as will enable others skilled in the art to which it appertains to make and use the same.

My invention relates to an improvement in belt catchers or supports.

In sewing-machines, particularly those which are adapted to be used in manufacturing establishments, and run by power, the supporting-frame for the needle, needle-shaft, and mechanism immediately connected therewith is adapted to be tilted backwardly for oiling or other purposes. The backwardly-tilting motion of the said frame tends to slacken the belt which connects the pulley on the needle-shaft with the drive-pulley on the drive-shaft, and thereby renders it liable to slip out of place, hindering and annoying the operator.

The object of my present invention is to provide a catcher or support for keeping the tension of the belt nearly or quite uniform throughout the tilting movement of the needle-supporting frame.

With this end in view my invention consists in certain features of construction and combinations of parts, as will be hereinafter described, and pointed out in the claims.

In the accompanying drawings, Figure 1 is a view in end elevation of a sewing-machine hinged to a support, the driving-shaft, belt, and belt catcher or support. The position of the parts, when the machine is tilted backwardly, is shown in dotted lines in the same figure. Fig. 2 is a front view of the belt catcher or support, and Figs. 3 and 4 represent modifications.

A represents a table, bench, or other suitable support for the sewing-machine.

B represents the supporting-frame of the machine, in which frame the needle-shaft C is journaled and provided with the belt-pulley D, rigidly secured thereon. The base of the frame B is hinged at its rear end to the support A, as shown at E. The drive-shaft F, with its drive-pulley G secured thereon, is located below, and somewhat to the rear of the shaft C and pulley D.

H indicates the belt connecting the drive-pulley G with the pulley C.

By noticing the course (shown by a curved dotted line) which the pulley D takes when the machine is tilted backwardly, it will be seen that it approaches the pulley G quite rapidly after it has swung a short distance, and that the belt H, by the time the pulley D reaches the position D' and the frame B rests against the stop b', will become very slack.

At a point nearly or quite in the projected axis of the hinge E a peg or spool, I, is placed, occupying a position across the path in which the belt H would travel as the machine is tilted backwardly. The peg or spool I might be set rigidly in position; but I prefer to support it yieldingly, as shown in the drawings.

L represents a piece of spring-wire bent laterally at its upper end to receive a spool, I, and coiled at or near its base, as shown at K, to give it a yielding motion in the direction of the path in which the belt travels. At its lower end the wire L is turned outwardly and bent in triangular shape to receive the three-armed clamp M, which is secured to the base by means of a screw or bolt, *m*. As the two parts of the belt H are brought in contact with the spool, the belt is shortened a little, and as the pulley D swings backwardly the spool I will yield enough to keep the tension quite uniform.

This simple device for catching or supporting the belt may be constructed in several approved ways.

In Fig. 3 the arm L', carrying the spool, is constructed of cast metal or other rigid material, and the spool I formed integral therewith or secured firmly thereto. The arm L' is provided with a circular disk, *l*, which works in a socket, O, secured to a rigid support. The disk *l* is secured within the socket by a screw, *o*, which also secures one end of a coil-spring, K', to the base. The opposite end of the spring is secured to the disk *l*, and thereby holds the arm L' yieldingly in position.

In Fig. 4 the spool-supporting arm L'' consists simply of a spring-wire bent loop-shaped, and secured at one end to the support A, or other rigid support.

It is evident that slight changes might be resorted to in the shapes and arrangements of the several parts without departing from the spirit and scope of my invention; hence I do not wish to limit myself strictly to the construction herein set forth; but, Having fully described my invention, what I claim as new, and desire to secure by Letters Patent, is—

1. In a sewing-machine, the combination, with a belt connecting the drive-shaft with the needle-shaft, the latter being journaled in a tilting frame, of a yielding peg or spool located in the path of the belt, and adapted to catch and support the same when the frame is tilted, substantially as set forth.

2. In a sewing-machine, the combination, with a belt connecting the drive-shaft with the needle-shaft, the latter being journaled in a movable frame, of a peg or spool secured to the end of a spring-arm, and adapted to clutch and support the belt when the table is tilted, substantially as set forth.

3. In a sewing-machine in which the needle-shaft is journaled to a support adapted to be moved toward and away from the drive-shaft, a belt catcher and supporter consisting, essentially, of an arm carrying a peg or spool on its upper end and connected with a rigid support in a yielding rocking adjustment, the said peg or spool adapted to catch and support the belt while the table remains in a tilted position, substantially as set forth.

4. The belt catcher and support consisting, essentially, of the spring-wire bent at its upper end to support the spool and at its lower end to receive the clamp, and coiled between its upper and lower end to give it elasticity for the purpose, substantially as set forth.

In testimony whereof I have signed this specification in the presence of two subscribing witnesses.

SAMUEL N. SILVER.

Witnesses:
NATHAN W. HARRIS,
FLAVILLA A. LUCE.